US008059327B1

(12) United States Patent
Erdogan et al.

(10) Patent No.: US 8,059,327 B1
(45) Date of Patent: Nov. 15, 2011

(54) VARIABLE SPECTRAL FILTER APPARATUS

(75) Inventors: Turan Erdogan, Spencerport, NY (US); Robert James Beeson, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 0 days.

(21) Appl. No.: 12/770,160

(22) Filed: Apr. 29, 2010

(51) Int. Cl.
*G02B 26/00* (2006.01)
(52) U.S. Cl. .................. 359/290; 359/889; 359/891
(58) Field of Classification Search .............. 359/290, 359/291, 889, 891
See application file for complete search history.

(56) References Cited

U.S. PATENT DOCUMENTS

| | | | |
|---|---|---|---|
| 2,406,318 A | 8/1946 | Brace | |
| 2,670,400 A | 2/1954 | Grunwald | |
| 3,306,158 A | 2/1967 | Makabe et al. | |
| 3,390,604 A | 7/1968 | Makabe | |
| 3,492,478 A | 1/1970 | Smith | |
| 3,861,788 A | 1/1975 | Webster | |
| 4,082,464 A | 4/1978 | Johnson, Jr. | |
| 4,084,909 A | 4/1978 | Mathisen | |
| 4,141,653 A | 2/1979 | Arnold | |
| 4,176,916 A | 12/1979 | Carpenter | |
| 4,410,272 A | 10/1983 | Beauvineau et al. | |
| 4,738,535 A | 4/1988 | Webster | |
| 4,772,798 A | 9/1988 | Craig | |
| 4,775,234 A | 10/1988 | Shimomura | |
| 5,591,981 A | 1/1997 | Heffelfinger et al. | |
| 5,767,965 A | 6/1998 | Zhou et al. | |
| 5,953,169 A * | 9/1999 | Tsai | 359/889 |
| 7,420,678 B2 | 9/2008 | Lundgren et al. | |
| 2005/0171630 A1* | 8/2005 | Dinauer et al. | 700/166 |

* cited by examiner

*Primary Examiner* — Ricky Mack
*Assistant Examiner* — James Jones
(74) *Attorney, Agent, or Firm* — Louis S. Horvath

(57) ABSTRACT

A variable spectral filter apparatus has a filter support rotatable about a single axis of rotation and has at least first and second transmissive spectral filters, each spectral filter having a filter width defined by its first and second edges, wherein the filter width is orthogonal to the axis. The first edges of the filters are equidistant from the axis of rotation when the filter support is rotated to any angle. The plane of each of the spectral filters is parallel to the axis. Rotational positions of the filter support about the axis of rotation, over a first 60 degree range of angles, define, between the first and second edges of at least the first spectral filter, an undeviated filtered light path of at least half the filter width that extends orthogonally with respect to the axis. A rotational actuator is energizable to rotate the filter support about the axis.

20 Claims, 13 Drawing Sheets

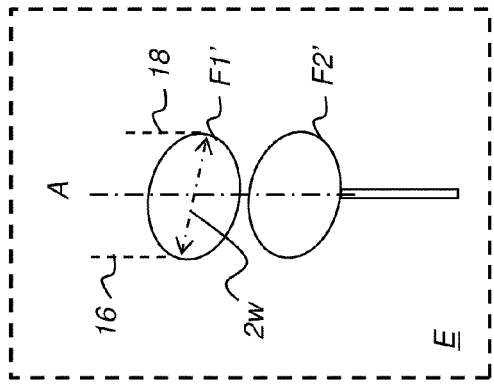
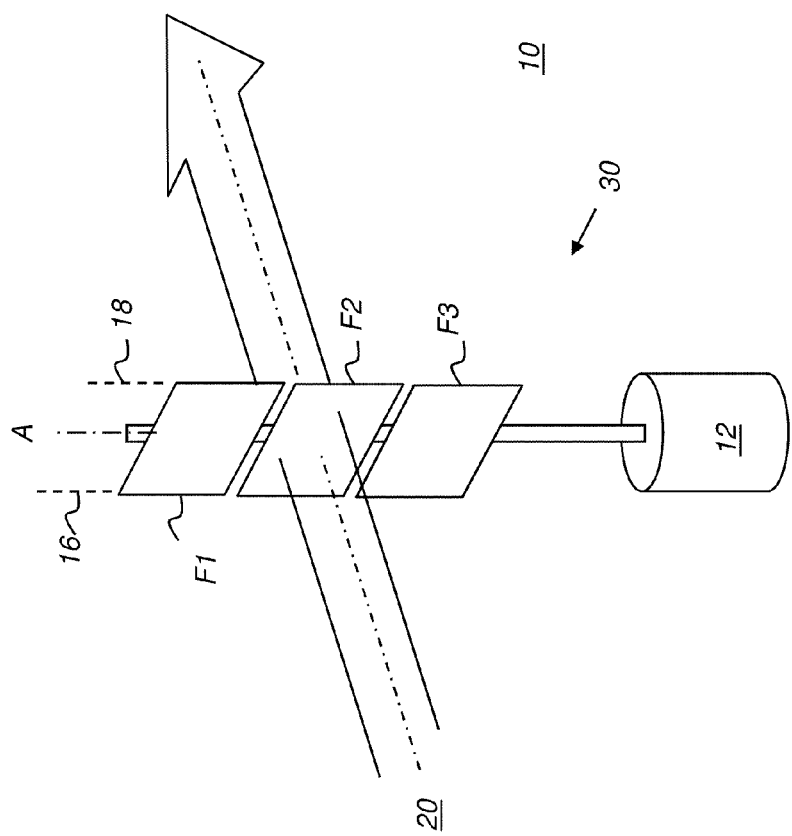
FIG. 2

VARIABLE SPECTRAL FILTER APPARATUS

FIELD OF THE INVENTION

This invention generally relates to tunable optical filters and more particularly relates to an apparatus for successively positioning and orienting each of a sequence of optical filters in the path of a light beam.

BACKGROUND OF THE INVENTION

In many types of optical instruments and systems, it is necessary to isolate light spectrally, that is, according to its wavelength or wavelength band. In fluorescence microscopy, for example, different fluorophores absorb and emit light at different wavelengths and some type of wavelength-selection mechanism is needed in order to select the wavelength of the excitation light or to detect how much light energy there is at specific emission wavelengths.

Conventional optical components for obtaining accurate wavelength selection include various types of diffraction gratings and interference filters. Diffraction gratings permit any wavelength within a range to be selected, and can accommodate a change of wavelength relatively quickly, since only rotation of the grating is required. Thus, gratings have been widely used in many scanning spectral measurement systems. However, gratings do not offer very good spectral discrimination. For example, spectral edges are conventionally not highly sloped and out-of-band blocking is conventionally poor. Moreover, gratings have limited transmission, exhibit polarization dependencies, and are not suitable for two-dimensional imaging applications, since one spatial dimension carries the spectral information thus leaving only one dimension to carry spatial information.

Optical thin-film interference filters offer improvement over diffraction gratings in many ways, are better suited for imaging, and exhibit exceptionally high transmission with steep spectral edges for improved spectral discrimination. In operation, thin-film interference filters are wavelength-selective as a result of interference effects that take place between incident and reflected waves at boundaries between thin layers of materials having different refractive indices. Interference filters conventionally include a dielectric stack composed of multiple alternating layers of two or more dielectric materials having different refractive indices. In a conventional thin-film interference filter, each of the respective layers of the filter stack is very thin, e.g., having an optical thickness (physical thickness times the refractive index of the layer) on the order of a quarter wavelength of light. These layers may be deposited on one or more substrates (e.g., a glass substrate) and in various configurations, to provide one or more band-pass, or band-rejection filter characteristics.

Thin-film filters have been conventionally regarded as "fixed" filters, in that each thin-film filter has a certain spectral function that is conventionally usable over a limited wavelength band at a particular angle of incidence. Where it is necessary to handle light over a different wavelength band, a filter swapping mechanism such as a filter wheel is used to index each filter into position.

Tunable thin-film filters represent a considerable improvement in thin-film filter design. Tuned performance of thin-film filters relates to the phenomenon of spectral shift with incident angle. As the tunable filter rotates and the angle of incidence of a light beam on the filter changes, the wavelength response of the tunable filter changes within its usable range. In general, as the angle of incidence (AOI) deviates further from normal (0 degree angle of incidence), the filter spectrum shifts toward shorter wavelengths. For example, commercially available VersaChrome™ Tunable Filters from Semrock, Inc., Rochester, N.Y. offer a tuning range of greater than 12% of the wavelength at normal incidence as angular orientations relative to incident light vary from 0 to 60 degrees. With this design, only five interference filters are needed to cover the full visible spectrum. An exemplary set of commercially available interference filters of this type have the following ranges, each tunable from 0 to 60 degrees AOI:

Filter 1: 390-440 nm
Filter 2: 440-490 nm
Filter 3: 490-550 nm
Filter 4: 550-620 nm
Filter 5: 620-700 nm Given this tunability feature, for example, a single filter (such as Filter 4) could be positioned in the light beam and tuned by rotation to sample light over a 30 nm range (such as 575-605 nm).

In many optical applications, it is beneficial to sample light at particular wavelengths over a larger range of wavelengths. Using the exemplary list above, this may mean wavelengths in the ranges of multiple filters, such as extending over the range covered by Filters 2, 3, and 4, or in some other wavelength range. Where this is the case, some method must be provided both for switching or indexing from one filter to the next and, with the selected filter in place, for changing the angular orientation of the selected filter.

There have been a number of methods used for filter swapping or indexing and for changing device angular orientation with respect to an incident light beam. For example, U.S. Pat. No. 4,084,909 entitled "Drum Monochromator" to Mathisen and U.S. Pat. No. 4,082,464 entitled "Optical Analysis System Having Rotating Filters" to Johnson both describe a rotating drum with a selection of interference filters arrayed about the circumference. U.S. Pat. No. 5,591,981 entitled "Tunable Excitation and/or Tunable Emission Fluorescence Imaging" to Heffelfinger et al. describes a tuned emission source with a filter wheel that is itself rotated on a second axis for wavelength tuning. U.S. Pat. No. 4,176,916 entitled "Cam Filter Wheel" to Carpenter describes a filter wheel in which each individual filter is tilted as the wheel rotates by the action of a cam as it passes in front of the light beam. U.S. Pat. No. 3,861,788 entitled "Optical Analyzer for Agricultural Products" to Webster describes a paddle-wheel type filter array in which a set of different interference filters rotate on an axis to present a single filter at a time to a beam of incident light. U.S. Pat. No. 3,390,604 entitled "Apparatus for Interchanging Diffraction Gratings in a Grating Spectroscope" to Makabe describes a set of different diffraction gratings mounted on a slide table that can be successively disposed for reflecting a beam of light as part of a monochromator and are rotated on an axis for variable wavelength response.

Although conventional solutions such as these provide some techniques for positioning and orienting each of a set of spectral selection components, none of them meets all of the following design goals for a variable spectral filter apparatus:

(i) Variable angular orientation of the filter over the full range from 0 to up to 60 degrees. Many of the conventional solutions offer only a limited range of angular orientations for the filter that lies in the light beam path.
(ii) Short optical path length.
(iii) Insertion into a light beam without beam redirection. The input and output light should be in the same plane and in the same direction, so that the apparatus used for spectral discrimination can be used as a retrofit in an existing instrument or other optical system.
(iv) Fast access time when indexing between filters.

(v) Small filter size. Preferably each filter should be no larger than the size required to fully encompass the light beam when the filter is tilted at the maximum angle of incidence.

(vi) Small footprint, reduced weight, and reduced moment of inertia.

(vii) Both switching and tuning of the filters using a single mechanical axis. Preferably, a single actuator should serve for both filter switching and changing angular orientation.

(viii) Capable of switching between two, three, or more than three filters.

Shortcomings of the type of approach shown in the Mathison '909 and Johnson '464 disclosures, for example, relate to requirements (i), (ii), (iii), (v), and (vi). Shortcomings of the approach taught by the Heffelfinger et al. '981 disclosure relate to requirements (iv), (vi), and (vii). Shortcomings of the approach described in the Carpenter '916 disclosure relate to the requirements (i), (iv), and (vi). Shortcomings of the approach described in the Webster '788 patent relate to requirements (i), (ii), (v), and (viii). Note that for this case there is a trade-off between requirement (i) and requirements (ii) and (v). It is possible to achieve tuning up to 30 degrees and maintain a short optical path length and small filter size. However, to achieve tuning beyond 30 degrees requires a substantial increase of both the optical path length and the filter size. Shortcomings of the type of device taught in the Makabe '604 patent relate to requirements (iv), (v), (vi), (vii), and (viii). In addition, concerns with high cost and mechanical complexity make a number of these conventional solutions impractical for retrofit into existing designs of fluorescence microscopes and other devices.

Thus, it can be seen that there is a need for a variable spectral filter apparatus for positioning and orienting each of a set of spectral filters in the path of a light beam.

SUMMARY OF THE INVENTION

It is an object of the present invention to advance the spectral filtering art. With this object in mind, the present invention provides a variable spectral filter apparatus comprising:

a filter support that is rotatable about a single axis of rotation and that comprises at least first and second transmissive spectral filters, each spectral filter having a filter width defined by its first and second edges, wherein the filter width is in a direction that is orthogonal to the single axis of rotation, wherein the first edges of the at least first and second transmissive spectral filters are equidistant from the single axis of rotation when the filter support is rotated to any angle, and wherein the plane of each of the at least first and second transmissive spectral filters is parallel to the single axis of rotation, wherein rotational positions of the filter support about the single axis of rotation, over a first 60 degree range of angles, define, between the first and second edges of at least the first spectral filter, an undeviated filtered light path of at least about half the filter width, wherein the filtered light path extends orthogonally with respect to the single axis of rotation;
and a rotational actuator energizable to rotate the filter support about the single axis of rotation.

It is a feature of the present invention that it provides multiple tunable spectral filters in a configuration that allows both switching between filters and changing the angle-of-incidence orientation for each filter.

It is an advantage of the present invention that it supports retrofit applications where spectral filtering is useful, including those in instruments and devices where space is constrained and where the light path cannot be substantially altered.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 2 is a perspective view that shows a configuration of variable spectral filter apparatus using a stacked-filter arrangement according to one embodiment of the present invention.

DETAILED DESCRIPTION OF THE INVENTION

Figure 1:
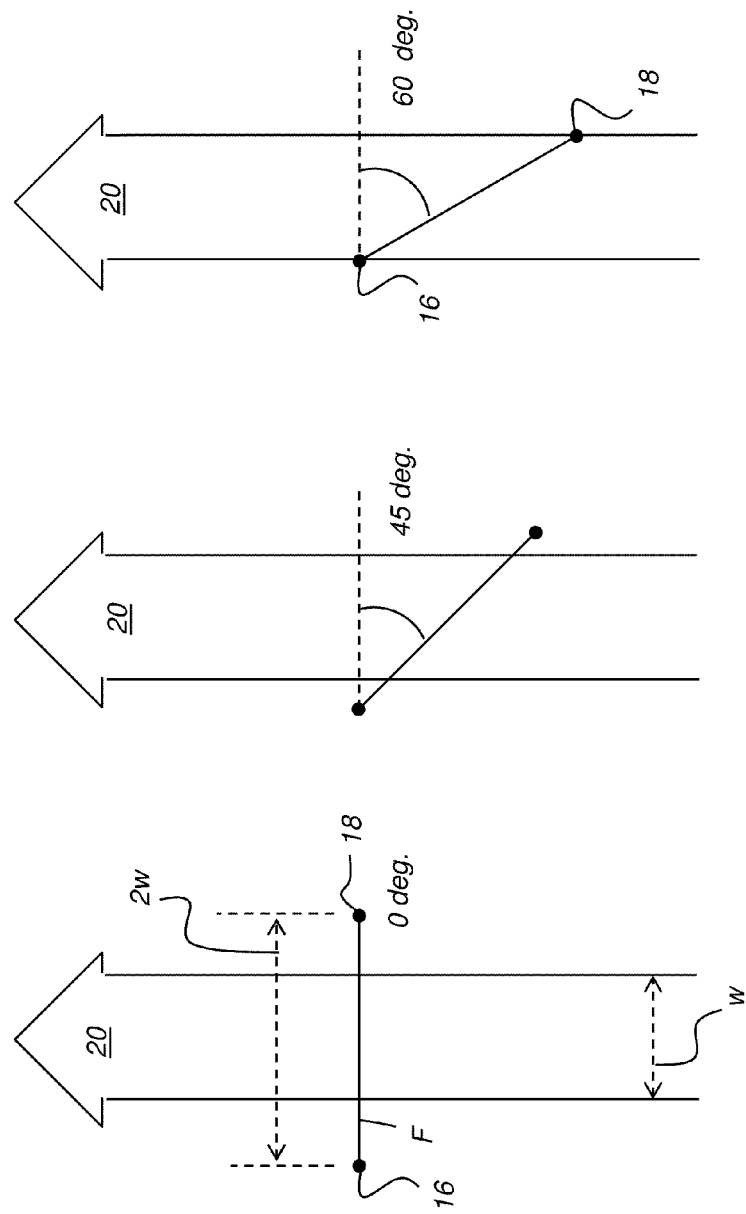
FIG. 1 is a schematic diagram showing dimensional and angular considerations for using tunable thin-film interference filters.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to more clearly emphasize basic structural relationships or principles of operation. Some conventional components that would be needed for implementation of the described embodiments, such as various types of optical mounts and related hardware, for example, are well known and are not shown in the drawings in order to simplify description of the invention itself. In the drawings and text that follow, like components are designated with like reference numerals, and similar descriptions concerning components and arrangement or interaction of components already described are omitted. Where they are used, the terms "first", "second", "third", and so on, do not necessarily denote any ordinal or priority relation, but are simply used to more clearly distinguish one element from another.

In the context of the present disclosure, the term "transmissive spectral filter" refers to filters having a known transmission response over a given spectral range. Transmissive spectral filters include, but are not limited to, various types of band pass, short wavelength pass, long wavelength pass, edge, and notch filters, for example. Tunable thin-film interference filters are one type of transmissive spectral filter of particular interest for use in embodiments of the present invention.

In the context of the present disclosure, the term "index" is used to indicate a sequencing operation for switching between filters in a sequence, such as indexing from a first to a second filter.

In the context of the present disclosure, the term "undeviated light path" describes a continuous, stationary, essentially linear path of light, lying substantially within a single plane, wherein the direction of the light path or light beam from input to output is substantially unchanged. A "filtered light path" is an approximately transparent path having some predetermined cross-sectional dimensions (height and width) with an interposed transmissive spectral filter and with no other light-blocking obstructions in the path.

In the context of the present invention, filter "edges" or "side edges" are opposing sides or borders of the filter that define the filter width, wherein the width is the dimension of the filter that is orthogonal to an axis of rotation. Edges can be straight, rounded, or some other suitable shape. The height of the filter is measured in the direction parallel to the axis of rotation, from the "top" of the filter to the "bottom" of the filter. It should be emphasized that while height and width have their conventional vertical and horizontal representation in the Figures of this disclosure, other orientations of variable spectral filter apparatus are possible; that is, the axis of rotation need not be vertical as shown in Figures herein.

Embodiments of the present invention are designed to take advantage of tunable thin-film interference filters by providing a variable spectral filter apparatus having multiple interference filters, wherein each of the filters can be interposed in an undeviated light path as well as re-oriented over a wide range of incident angles with respect to a light beam in the light path. Unlike many of the conventional solutions for filter indexing and angular re-orientation, embodiments of the present invention enable each of several tunable filters to be oriented over a range of incident angles from 0 to 60 degrees, continuously cross-sectionally encompassing or circumscribing an undeviated light path over this angular range, wherein the light beam within this light path can be up to, or substantially up to, about half the width of the tunable filter.

The simplified schematic diagram of FIG. 1 shows, from a top view, dimensional and angular aspects for orientation of a tunable thin-film filter F. Dimensions are shown at the normal, or 0 degree angle of incidence (AOI) position furthest left. A light beam, filtered light path 20, is directed through tunable filter F and has a beam width (w) of up to half the width (2w) of filter F, measured between edges 16 and 18 of filter F. At the middle position in FIG. 1, filter F is oriented for an AOI of some intermediate angle over the range, shown as 45 degrees in this example. At furthest right in FIG. 1, the extreme end of the angular range is shown, with a 60 degree AOI orientation of tunable filter F. From this series of diagrams, it is readily seen that filtered light path 20 is continuously defined throughout the 0-60 degree AOI range, lying between edges 16 and 18 of filter F.

By defining a light path that is at least "about half the filter width" or "substantially half the filter width", the apparatus and methods of the present invention allow substantially the full width of the spectral filter to be in the path of incident light at positions in the approximately 60-degree range of angles. This makes efficient use of the filter surface area so that, considered in the width direction, substantially none of the filter is unused. In practice, there is likely to be some mechanical tolerance or feature of supporting hardware that results in defining a light path that may be slightly less than half the filter width at the 60 degree rotational position.

The perspective view of FIG. 2 shows a configuration of variable spectral filter apparatus 10 according to one embodiment of the present invention. In this stacked-filter arrangement, a number of tunable spectral filters F1, F2, and F3 are arranged as part of a filter support 30, at different positions with respect to axis of rotation A. Filter support 30 is rotatable about axis of rotation A and supports each of the tunable spectral filters at a planar orientation that is parallel to the axis of rotation A. Filter support 30, in cooperation with a rotational actuator 12, provides both (i) indexing from one filter to the next by translational movement parallel to the direction of axis of rotation A, thereby disposing one of the filters to define the filtered light path 20 through variable spectral filter apparatus 10; and (ii) angular orientation for response tuning by rotation of the filter about axis A. In this embodiment, axis A extends through each filter. Filtered light path 20 is undeviated and orthogonal to axis of rotation A.

An inset E in FIG. 2 shows an embodiment of filters F1' and F2' arranged in a similar manner, but having curved edges 16 and 18. The filter width, 2w in the examples given herein, is measured from edge to edge in a direction orthogonal to axis of rotation A, as shown.

Rotational actuator 12 can be any of a number of electromechanical rotary motors including, but not limited to, a stepper motor, a direct-current (DC) motor, and a galvanometer scanner ("galvo"). Some embodiments require rotation over a full 360 degrees, which can be accomplished by most conventional types of motors and rotational actuators. Galvos, however, are generally limited to a range of rotation less than 360 degrees, and thus may be used only for embodiments that do not require a full 360 degrees of rotation.

Figure 3:
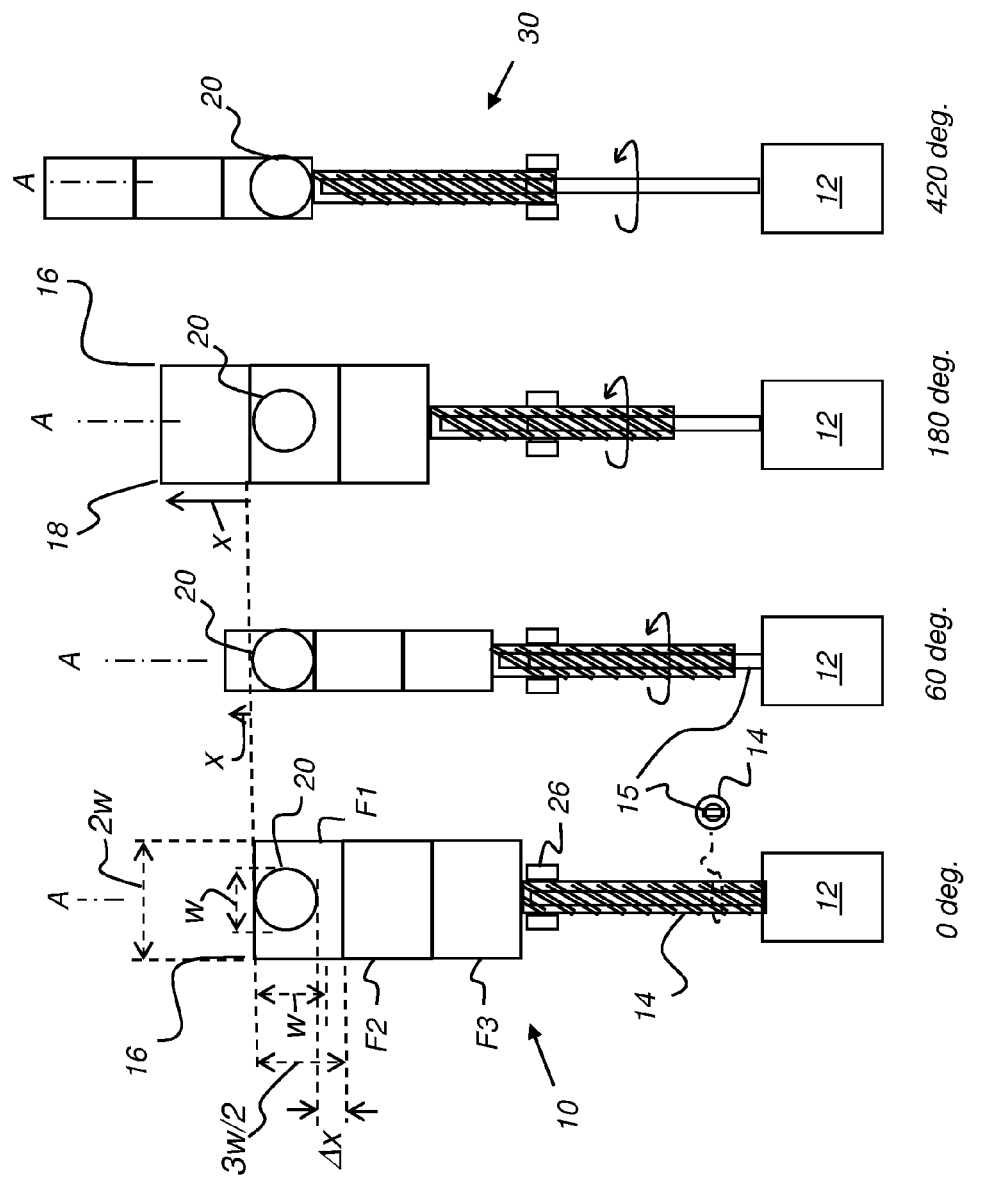
FIG. 3 is a side view that shows, for one stacked-filter embodiment, successive views of filter translation and rotation.

FIG. 3 shows, for one stacked-filter embodiment of filter support 30, successive views of filter indexing and changing angular orientation. Here, axis of rotation A extends through each of a set of stacked tunable filters, each filter disposed at a different position along the length of the axis. In the embodiment of filter support 30 shown, a hollow cylindrical threaded traveler 14 is rotated by a shaft 15 that is driven by rotational actuator 12. Traveler 14 rotates within a stationary threaded member 26 and moves along the axis A as actuator 12 turns shaft 15. As the inset axial cross-section shows, shaft 15 is "keyed" with one or more rails along its length that fit within one or more grooves inside the hollow traveler 14. With this arrangement, rotation of shaft 15 effects rotation of traveler 14 as well as its translation along axis A. As is clear to those skilled in the mechanical arts, other lead-screw-type transport systems are possible. Positions shown by way of example in FIG. 3 are at 0, 60, 180, and 420 degrees of rotation of actuator 12 and shaft 15. In the embodiment shown, lead screw threads are spaced so that, as actuator 12 rotates its shaft, filters F1, F2, and F3 are successively indexed into position, moved into filtered light path 20, with their AOI orientation changing at the same time. As was noted earlier with respect to FIG. 1, this filter support 30 arrangement defines a filtered light path 20 between the edges of one filter at a time, wherein the light path is undeviated (with input and output filtered light in the same direction and plane) and wherein the width (w) of the light path is at least half the filter width (2w), as defined between the edges of the filter F1, F2, or F3, throughout the range of 0-60 degrees AOI.

Still referring to FIG. 3, filter height must exceed the beam width or, alternately stated, exceed the width w of a rotationally symmetric filtered light path 20, by at least about half for the particular lead-screw pitch shown in this embodiment. That is, where the filter width is 2w as described earlier with respect to FIG. 1, the filter height is at least 3w/2 with the FIG. 3 embodiment.

The embodiment of FIG. 3 provides variable angular orientation of each tunable filter over the full range from 0 to 60 degrees. This embodiment provides a short optical path length and can be inserted into a light beam essentially without beam redirection, providing an undeviated light path with input and output light in the same direction and in the same plane. This arrangement allows fast access time between filters and is compact, allowing for small filter size. Expandable to two, three, four or more filters, this type of embodiment provides a small footprint, reduced weight, and reduced moment of inertia. Significantly, this embodiment provides indexing and tuning of each filter in the stack by using a single rotational axis and a single actuator.

Figure 4:
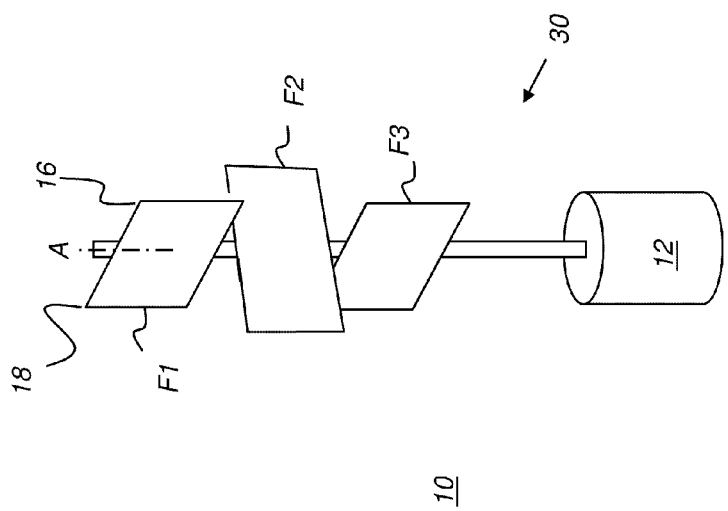
FIG. 4 is a perspective view that shows an alternate stacked-filter embodiment in which the filters are not coplanar.

It can be appreciated that the embodiment shown in FIG. 3 can be modified in any of a number of ways. Traveler 14 could be configured with a smaller or larger pitch than that shown in the FIG. 3 embodiment. A smaller pitch has the advantage of enabling a smaller filter height for a given beam width, but with a consequent loss of efficiency and speed associated with indexing between the filters. A larger pitch can result in higher speed operation, but also requires larger filter height for a given beam width, thus increasing the cost of the filters and resulting in a larger overall system. As another example, FIG. 4 shows an alternate embodiment of filter support 30 having stacked tunable filters in which the filters are also disposed at different positions along the axis of rotation A, but are not co-planar. This embodiment can be used for the case of a larger-pitch lead screw, for example.

It is instructive to consider how these pitch and size factors are related. Mathematically, suppose the pitch of the lead screw traveler 14 is p mm/deg (i.e., the screw advances p mm for each degree of rotation). Then $\Delta x$, the height of the filter minus the width w of the light beam is given by $$\Delta x = p \times 60°$$

The total travel distance along axis of rotation A, X in mm, required by the lead screw transport mechanism for a stack of N filters is given by $$X = (N-1) \times w + N \times \Delta x$$

The total angular rotation of the lead screw is then simply X/p degrees. As an example, for the embodiment shown in FIG. 3, the pitch is p=w/120°, so that $\Delta x$=w/2, and thus the total travel X is 3.5w and the total rotation is 420°.

Figure 5:
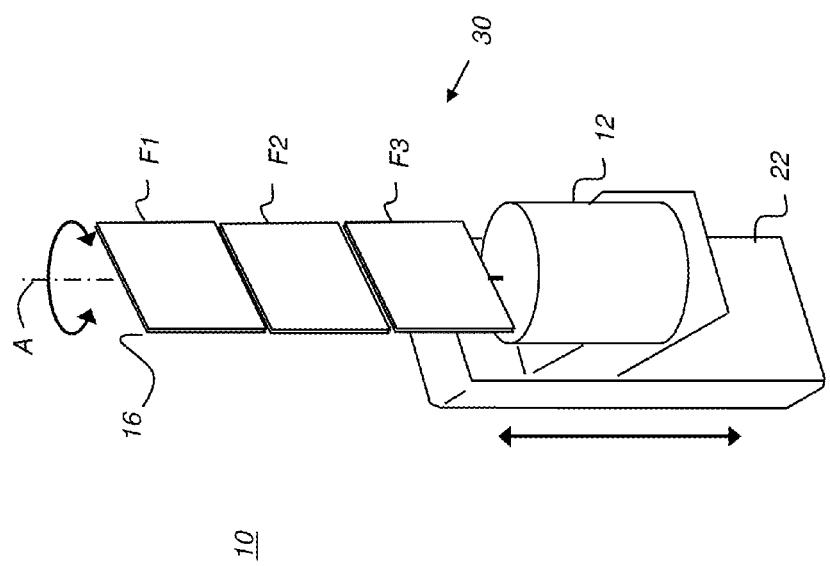
FIG. 5 is a perspective view of an alternate embodiment that shows a stacked filter arrangement on a vertical stage.

The alternate embodiment of FIG. 5 shows a stacked tunable filter arrangement in which filter support 30 is provided on a vertical stage 22. This embodiment can operate with one actuator 12, as shown, driving both filter support 30 rotation and, through a geared arrangement, vertical translation. Alternately, a separate actuator may be used for vertical translation of stage 22. Some combination of the staggered-angle arrangement of FIG. 4 and the independent vertical actuator of FIG. 5 may, for example, provide a fast switching speed, with less transition time when indexing between filters. Each of the embodiments shown in FIGS. 2-5 also provide the advantage of a centered light path for a beam, with respect to beam width; at each AOI over the 0-60 degree range, the filtered light path 20 is substantially centered at the center of the selected filter (that is, within less than about +/−12% of the width distance from the center of the selected filter).

In the stacked filter arrangement of FIGS. 2-5, axis of rotation A extends through each tunable filter, so that each filter rotates about axis A. In this embodiment, first filter edges 16 for each spectral filter are substantially equidistant from the axis of rotation A; similarly, second filter edges 18 for each of the filters are substantially at the same distance from axis of rotation A. This arrangement helps to address considerations related to moment of inertia for filter support 30.

Figure 6:
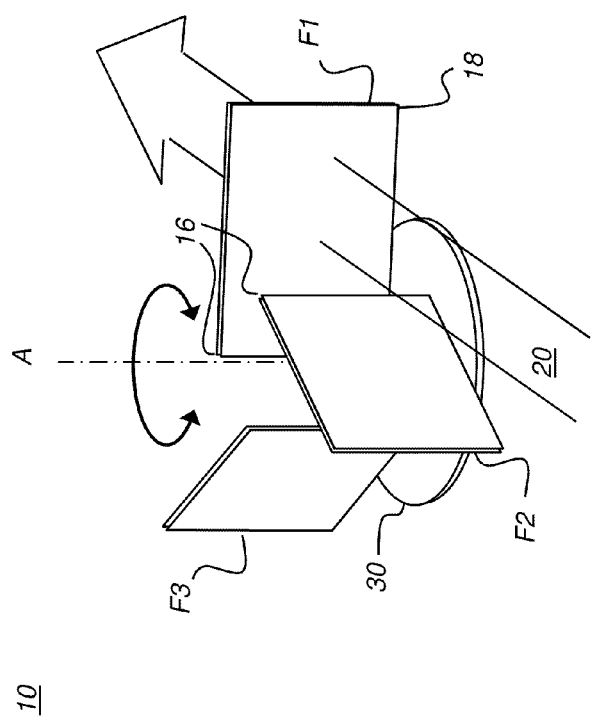
FIG. 6 is a perspective view showing a configuration of a variable spectral filter apparatus using a turntable arrangement according to an alternate embodiment of the present invention.

Embodiments of filter support 30 shown in FIG. 6 and following space the filters apart from axis A so that the axis does not extend through any filter and, instead, filters revolve about, or orbit, axis of rotation A. As with the stacked filter embodiments of FIGS. 2-5, the embodiments of FIG. 6 and following have filter spacing substantially equidistant from axis of rotation A. Differently stated, the first edges 16 of each of the filters are equidistant from axis of rotation A, to within no more than about +/−12%. As shown in FIG. 6, filter support 30 has a carousel or turntable configuration, with filters F1, F2, and F3 fixed in position within filter support 30 and oriented in different planes that are each substantially parallel to axis A. Axis of rotation A extends orthogonally to filter support 30. As with the stacked-filter embodiments of FIGS. 2-5, filtered light path 20 extends orthogonally with respect to axis A.

Figure 7:
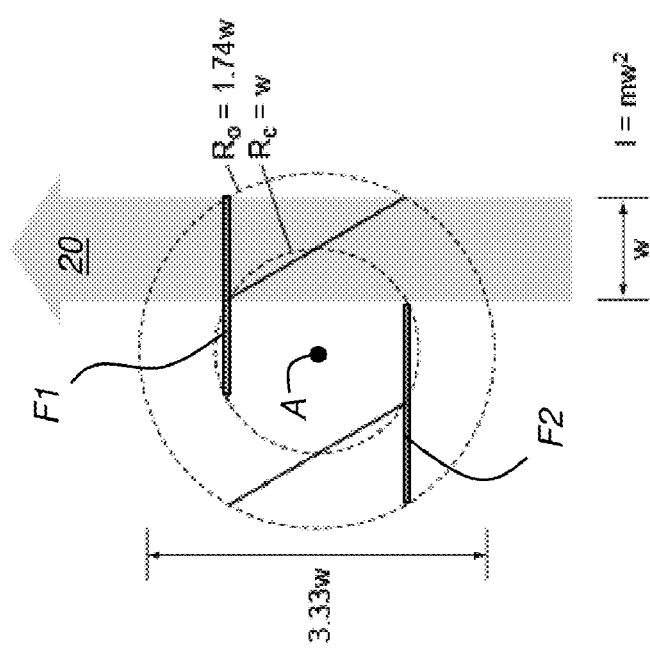
FIG. 7 is a schematic top view of a turntable embodiment using two tunable spectral filters.
Figure 8A:
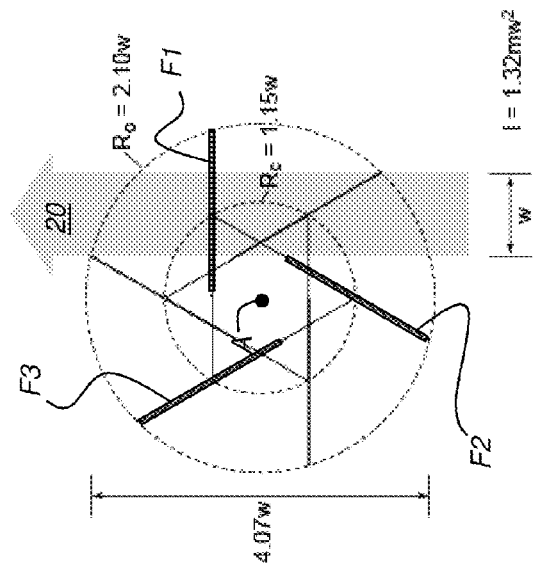
FIG. 8A is a schematic top view of a turntable embodiment using three tunable spectral filters.
Figure 8B:
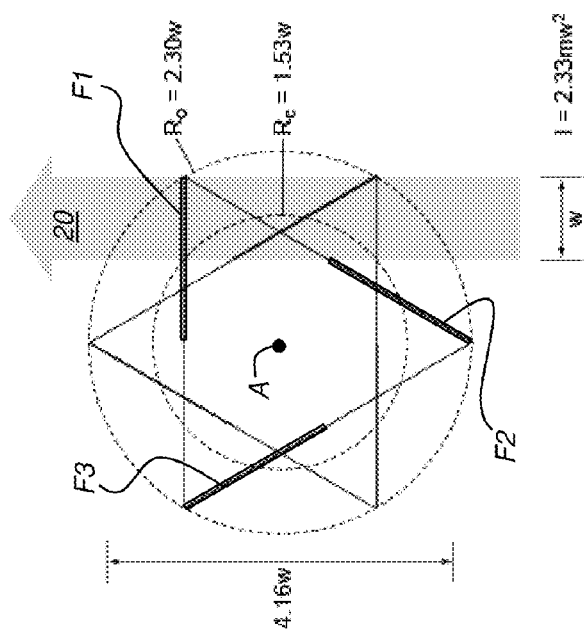
FIG. 8B is a schematic top view of an alternate turntable embodiment using three tunable spectral filters.
Figure 9:
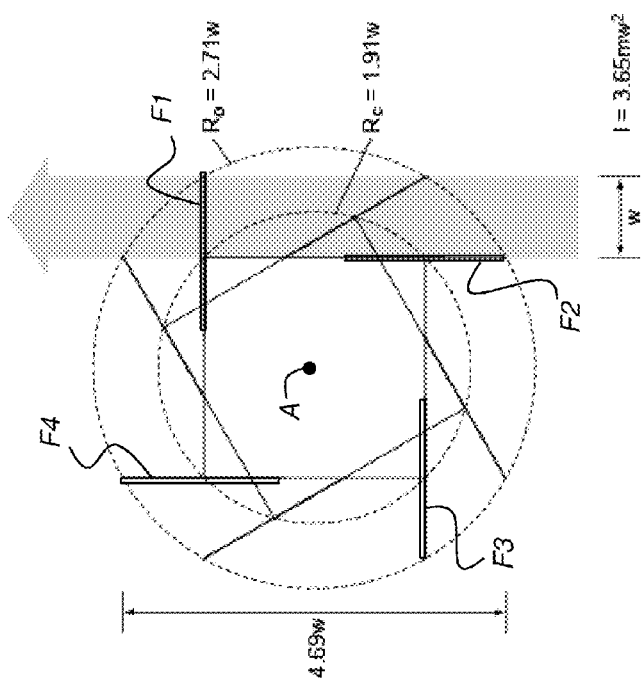
FIG. 9 is a schematic top view of an alternate turntable embodiment using four tunable spectral filters.

FIGS. 7, 8A, 8B, and 9 show top schematic views of filter spacing using the turntable configuration of filter support 30 introduced in FIG. 6, in embodiments with 2, 3, and 4 spectral filters. In these figures, each filter position is represented twice: in bold at the initial rotational position wherein filter F1 is at an AOI of 0 degrees, and with a narrower line at the rotational position of the turntable that is 60 degrees from that initial position. Each of the example arrangements of FIGS. 7-9 shows the overall diameter of each variable support filter apparatus 10, in terms of light path or beam width w, limited by the outer edges of the filters. Normalized moment of inertia values are also shown for each of the embodiments in FIGS. 7-9, relative to the moment of inertia of the two-filter case in FIG. 7, and where it is assumed that the mass associated with each moment is dominated by the mass of the filters (i.e., mass associated with any support structure of filter support 30 is disregarded). The following variables are also shown:

$R_O$ gives the radius measured from the axis A to the outer edges of the filters.

$R_C$ gives the radius measured from the axis A to the center of each filter.

The schematic view of FIG. 7 shows an embodiment using two spectral filters

F1 and F2. The schematic views of FIGS. 8A and 8B show two alternate embodiments using three spectral filters F1, F2, and F3. The FIG. 8B arrangement has a significantly lower moment of inertia than that of FIG. 8A. The schematic view of FIG. 9 shows an embodiment using four spectral filters F1, F2, F3, and F4.

One consideration with turntable embodiments relates to reducing the size and, correspondingly, the moment of inertia of filter support 30 with its two or more tunable filters. As has been stated, some amount of space is needed between each filter and the axis of rotation A. Reducing this amount of space while maintaining the needed undeviated filtered light path 20 over a 60 degree range requires consideration of a number of factors, shown in the schematic diagram of FIG. 10. Constraining the filter width to be equal to twice the beam width (filter width=2w), such that the beam just fills the width of the filter when it is tuned to a 60 degree angle of incidence, the smallest value of radius $R_C$ can be found by choosing suitable values of filter offset parameters x and y for a given number of filters on the support (2, 3, or 4, for example), along with the relative position of the beam as described by its offset distance s from the axis of rotation A. More specifically, x is the distance from the plane containing one of the filters to the axis A, and y is the distance from the center of the filter to the plane that contains the axis A and the line along which x is measured.

Figure 10:
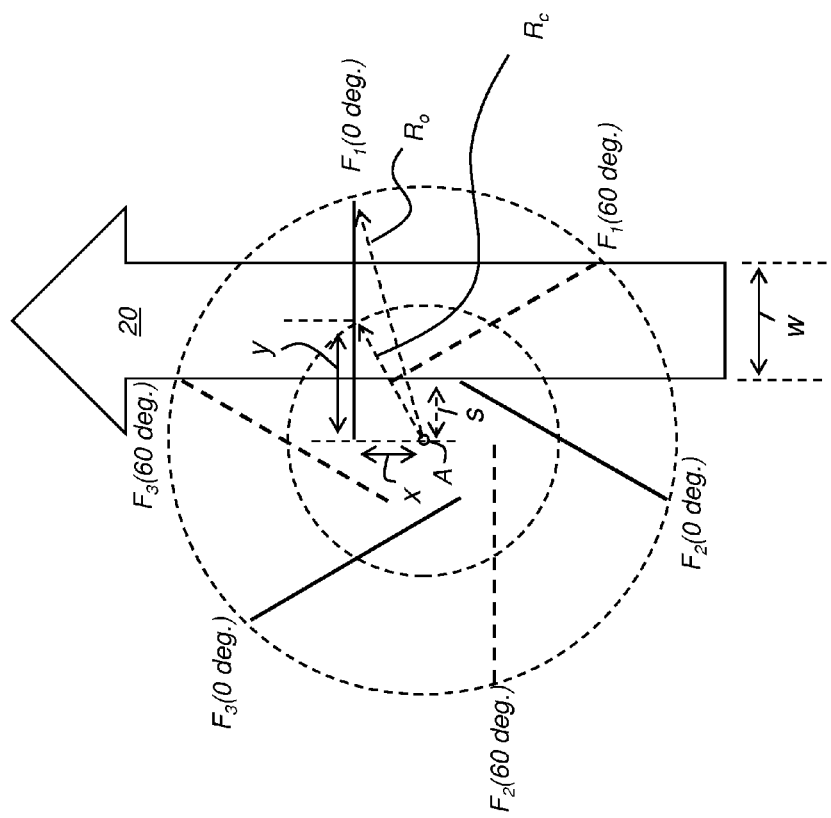
FIG. 10 is a schematic top view showing various parameters used to determine positioning of multiple spectral filters in a turntable embodiment.

With reference to variables shown in FIG. 10, with filter F1-F3 angular positions labeled, the mathematical analysis of suitable values is based on the following constraints:

(i) When filter F1 is oriented at an AOI of 0 degrees (the) "F1(0°)" case), the beam of width w must pass through the filter, which means $s \leq y \leq s+w$.

(ii) When filter F1 is oriented at an AOI of 60 degrees (the) "F1(60°)" case), the beam should just fill the entire filter, which results in the following relationship between x, y, and s: $\sqrt{3}x+y=2s+w$ (iii) When filter F1 is oriented at 0 degrees, the beam must not be obstructed by filter F2 (the) "F2(0°)" case). This constraint results in an inequality relationship between x, y, and s.

(iv) When filter F1 is oriented at 60 degrees, the beam must not be obstructed by filter F(N), where N is the total of number of filters on the support (e.g., N=2, 3, or 4, for example). In the example of FIG. 10, N is 3. This "F(N) (60°)" case also results in an inequality relationship between x, y, and s.

Subject to these four constraints, one can determine the values of x, y, and s, that result in minimizing the value of the radius $R_C$. This, in turn, helps to reduce overall spacing requirements and the moment of inertia of the filter support.

Results for a few exemplary cases follow:

Case (i): 3 filters accommodating tuning from 0 to 60 degrees for each filter;

$$s = \frac{w}{2} = 0.5000w$$
$$x = \frac{w}{\sqrt{3}} = 0.5774w$$
$$y = w = 1.0000w$$
$$R_c = \frac{2}{\sqrt{3}}w = 1.1547w$$

Case (ii) 4 filters accommodating tuning from 0 to 60 degrees for each filter;

$$s = \frac{w}{\sqrt{3}-1} = 1.3660w$$
$$x = \frac{w}{\sqrt{3}-1} = 1.3660w$$
$$y = \frac{w}{\sqrt{3}-1} = 1.3660w$$
$$R_c = \frac{\sqrt{2}}{\sqrt{3}-1}w = 1.9319w$$

Case (iii) 4 filters accommodating tuning from 20 to 60 degrees for each filter.

$$s = \frac{3\sin(20°) + \sqrt{3}\cos(20°)}{(1+\sqrt{3})\sin(20°) + (1-\sqrt{3})\cos(20°) + 2}w = 1.1812w$$
$$x = 1.2984w$$
$$y = 1.1136w$$
$$R_c = 1.7105w$$

As Case (iii) demonstrates, a reduction in the angular tuning range can result in a more compact filter arrangement. Because the sensitivity of wavelength to angle is relatively small near 0 degrees AOI, a larger amount of angular rotation is needed in order to shift the spectral transmission characteristics over small angles of incidence. By comparison, rotation over larger angles, here, over the range from 20 to 60 degrees AOI, provides a more pronounced shift in spectral characteristics.

For Case (iii), the smallest radius $R_C$ is reduced by over 11% by limiting the angular tuning range to only 20 to 60 degrees, compared to 0 to 60 degrees for case (ii). In terms of wavelength, this reduced angular tuning range results in a reduced wavelength tuning range of approximately 10%, compared to a wavelength tuning range of about 12% for the full angular tuning range.

Figure 11:
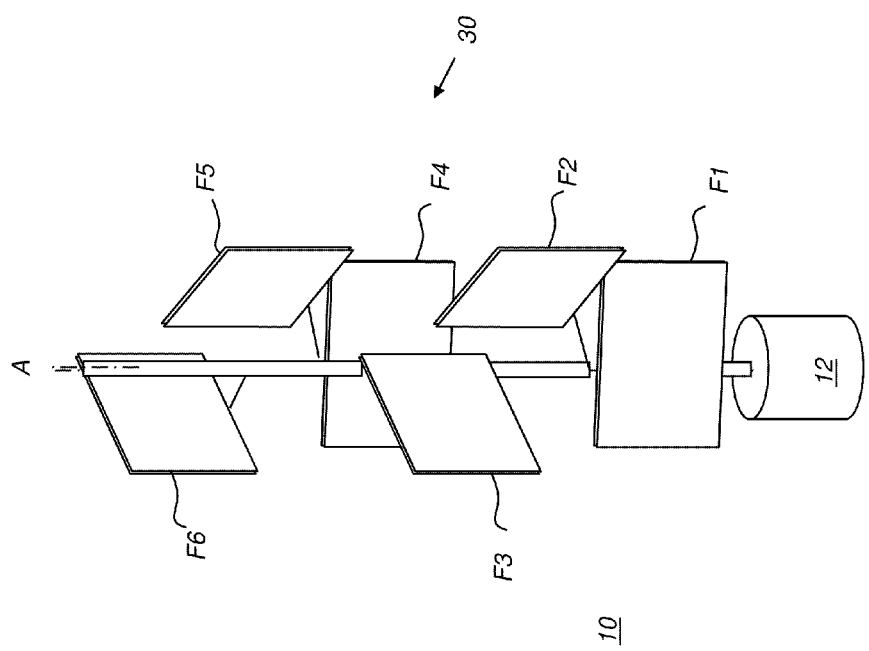
FIG. 11 is a perspective view of an embodiment using a helical arrangement of filters about the axis.
Figure 12:
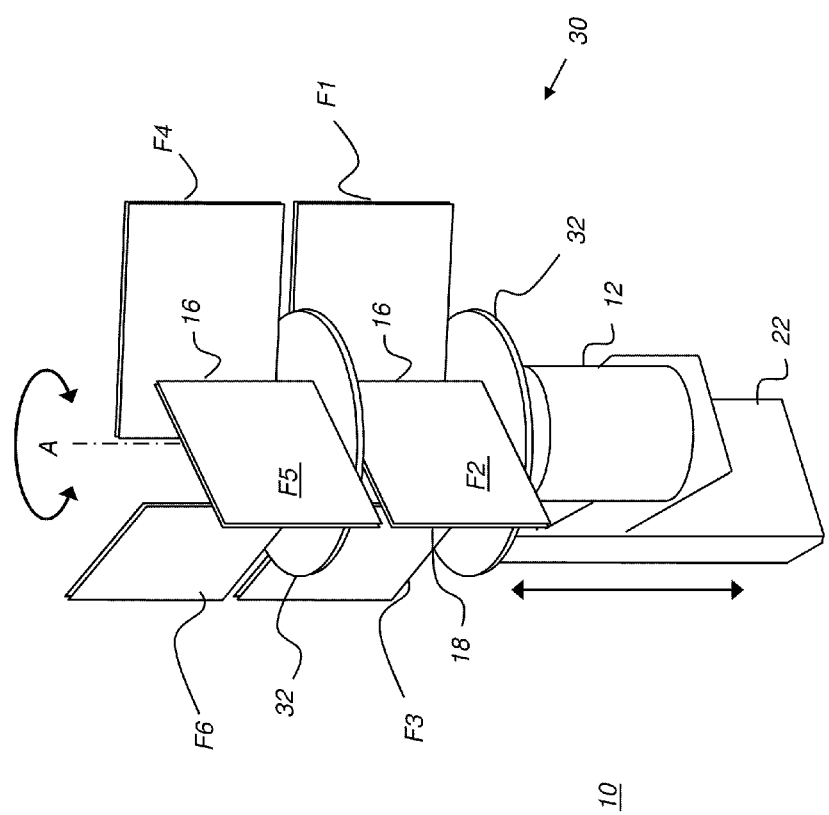
FIG. 12 is a perspective view of an embodiment that uses a stacked turntable arrangement of tunable spectral filters.

The alternate embodiments of FIGS. 11 and 12 combine both translational movement for filter indexing in the direction of the axis and changing angular orientation for filter tuning by filter revolution about the axis and thereby increase the number of tunable spectral filters that can be provided in a compact space. In the FIG. 11 embodiment, filter support 30 provides a helical arrangement, with tunable filters F1, F2, F3, F4, F5, and F6 staggered at different distances along the axis A. As with stacked and turntable embodiments described previously, the first edges of the transmissive spectral filters are substantially equidistant from the single axis of rotation when the filter support is rotated to any angle.

In the alternate embodiment of FIG. 12, a multi-stage turntable design is used for filter support 30, so that two or more turntables 32 are stacked atop one another with respect to axis A. This allows each of tunable filters F1, F2, F3, F4, F5, and F6 to be placed and oriented in the undeviated light path.

Figure 13:
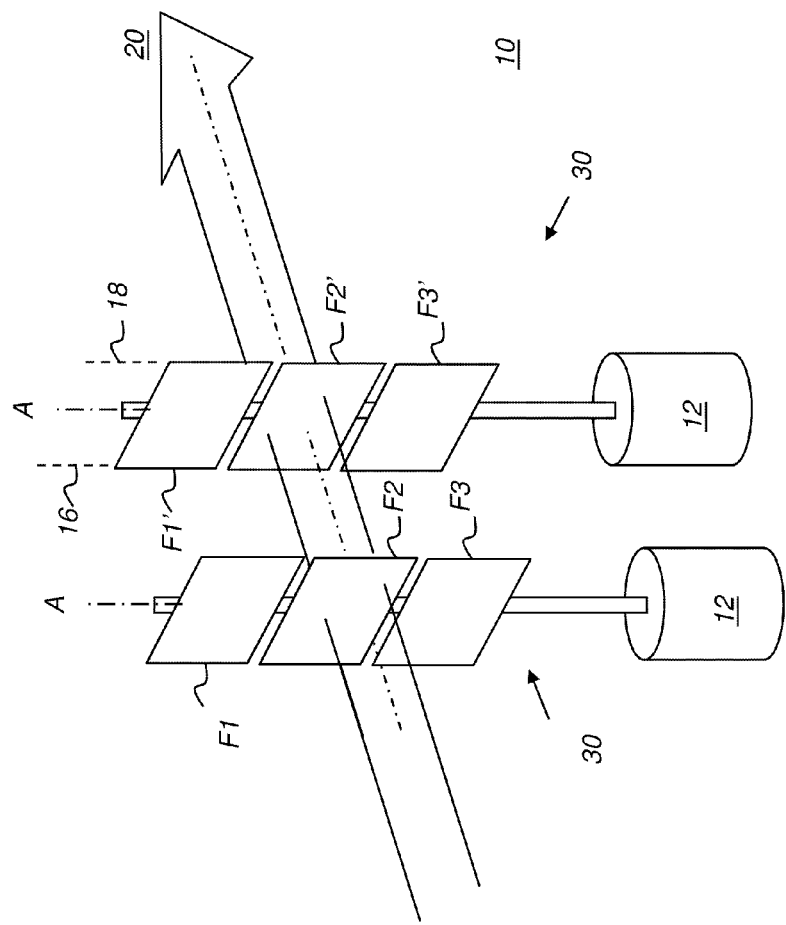
FIG. 13 is a perspective view of an embodiment that has two filter supports in series.

One method for using tunable spectral transmission filters effectively is to have two or more tunable filters in series, so that their combination provides a useful result. For example, providing both a long-wave-pass (LWP) filter and a short-wave-pass (SWP) filter in series yields a band pass filter characteristic with its passband edges defined by the edges of the LWP and SWP filters. This method can also be practiced using two variable spectral filter apparatus 10 in series, as shown in the example of FIG. 13. With tunable filters, such an arrangement allows a variable passband width. For example, filters F1, F2 and F3 can be LWP filters and paired filters F1', F2', and F3' can be SWP filters.

Embodiments of the present invention index successive filters into the filtered light path 20 either by rotation of filter support 30 about axis A or by translation of filter support 30 in the direction of axis A. The filters remain at fixed distances from axis A, substantially equidistant from axis of rotation A at any rotation angle.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, filter support 30 can have any of numerous types of brackets, frames, holders, or other hardware devices for positioning the filters, as is well known in the optomechanical design arts. Filters are represented in various figures of the present application as being rectangular, but other filter shapes are possible, including but not limited to circular and elliptical shapes. Angles of incidence greater than 60 degrees are possible with the stacked embodiments and where filter spacing permits this in turntable embodiments. The filtered light path would be less than half the width of the filter for angles of incidence greater than 60 degrees.

Thus, what is provided is an apparatus and method for providing a variable spectral filter apparatus.

PARTS LIST

10. Variable spectral filter apparatus
12. Rotational actuator
14. Traveler
15. Shaft
16, 18. Edge
20. Filtered light path
22. Vertical stage
26. Threaded member
30. Filter support
32. Turntable
A. Axis
E. Inset
F. Filter
F1, F2, F1', F2', F3, F3', F4, F5, F6. Filter

The invention claimed is:

1. A variable spectral filter apparatus comprising:
a filter support that is rotatable about a single axis of rotation and that comprises at least first and second transmissive spectral filters, each spectral filter having a filter width defined by its first and second edges, wherein the filter width is in a direction that is orthogonal to the single axis of rotation,
wherein the first edges of the at least first and second transmissive spectral filters are substantially equidistant from the single axis of rotation when the filter support is rotated to any angle,
and wherein the plane of each of the at least first and second transmissive spectral filters is substantially parallel to the single axis of rotation, wherein rotational positions of the filter support about the single axis of rotation, over a first 60 degree range of angles, define, between the first and second edges of at least the first spectral filter, an undeviated filtered light path of at least about half the filter width, wherein the filtered light path extends orthogonally with respect to the single axis of rotation; and
a rotational actuator energizable to rotate the filter support about the single axis of rotation.

2. The variable spectral filter apparatus of claim 1 wherein the axis of rotation extends through either of, or between, the first and second edges of the at least first and second transmissive spectral filters.

3. The variable spectral filter apparatus of claim 1 wherein both the first and second edges of each of the at least first and second transmissive spectral filters are spaced apart from the axis of rotation.

4. The variable spectral filter apparatus of claim 1 wherein the at least first and second transmissive spectral filters are each tunable over a range of wavelengths.

5. The variable spectral filter apparatus of claim 1 wherein the filter support further comprises a third transmissive spectral filter.

6. The variable spectral filter apparatus of claim 1 wherein the filter support further comprises a third and a fourth transmissive spectral filter.

7. The variable spectral filter apparatus of claim 1 wherein the filter support comprises a lead screw.

8. The variable spectral filter apparatus of claim 1 further comprising a translational stage with a translational actuator.

9. The variable spectral filter apparatus of claim 1 wherein the filtered light path is substantially centered on the center of the first spectral filter.

10. The variable spectral filter apparatus of claim 1 wherein the at least first and second transmissive spectral filters are coplanar.

11. The variable spectral filter apparatus of claim 1 wherein the rotational actuator provides 360-degree rotation.

12. The variable spectral filter apparatus of claim 1 wherein the rotational actuator is a galvanometer scanner.

13. A variable spectral filter apparatus comprising:
a filter support that is rotatable about a single axis of rotation and that comprises at least first, second, and third transmissive spectral filters, each spectral filter having a filter width defined by its first and second edges, wherein the filter width is in a direction that is orthogonal to the single axis of rotation,
wherein, for each of the at least first, second, and third transmissive spectral filters, the distance between the first edge of each filter and the axis is substantially equal,
and wherein the plane of each of the at least first and second transmissive spectral filters is substantially parallel to the single axis of rotation, wherein rotational positions of the filter support about the single axis of rotation, over a first 60 degree range of angles, define, between the first and second edges of at least the first spectral filter, an undeviated filtered light path of at least about half the filter width, wherein the filtered light path extends orthogonally with respect to the single axis of rotation; and
a rotational actuator energizable to rotate the filter support about the single axis of rotation.

14. The variable spectral filter apparatus of claim 13 wherein a single 360 degree rotation of the rotational actuator successively positions each of the at least first, second, and third transmissive spectral filters into the undeviated filtered light path and orients each filter over a corresponding 60 degree range of angles when the filter is disposed in the undeviated filtered light path.

15. A variable spectral filter apparatus comprising:
a filter support that is rotatable about a single axis of rotation and that comprises at least first and second transmissive spectral filters, each spectral filter having a filter width defined by its first and second edges, wherein the filter width is in a direction that is orthogonal to the single axis of rotation, wherein the plane of each of the at least first and second transmissive spectral filters is substantially parallel to the single axis of rotation, and wherein the axis of rotation extends between the first and second edges of each of at least first and second transmissive spectral filters; and a rotational actuator energizable to rotate the filter support.

16. The variable spectral filter apparatus of claim 15 wherein the at least first and second transmissive spectral filters are substantially in the same plane.

17. A variable spectral filter apparatus comprising:

a filter support comprising a first filter support turntable and a second filter support turntable stacked on the first turntable, each turntable rotatable about an axis of rotation and each turntable comprising at least first and second transmissive spectral filters, each spectral filter having a filter width defined by its first and second edges and supported within the turret at a planar orientation that is substantially parallel to the axis of rotation, wherein a rotational position of the first filter support turntable over a first 60 degree range of angles defines a filtered light path of at least about half the filter width that extends orthogonally with respect to the axis of rotation and that lies between the first and second edges of the first spectral filter; and a rotational actuator energizable to rotate the filter support.

18. The variable spectral filter apparatus of claim 17 wherein indexing from the first filter support turntable to the second filter support turntable is effected by translation along the axis of rotation.

19. A variable spectral filter apparatus comprising:

a filter support comprising at least first and second transmissive spectral filters; and a rotational actuator energizable to rotate an axial shaft that extends between the at least first and second transmissive spectral filters, wherein the filter support is rotatable about the axial shaft and supports each of the at least first and second transmissive spectral filters, each spaced apart from the axial shaft and each at a planar orientation that is substantially parallel to the length of the axial shaft, and wherein the distance between the second transmissive spectral filter and the rotational actuator, along the direction of the axial shaft, exceeds the distance between the first transmissive spectral filter and the rotational actuator.

20. A method for providing a filtered light path comprising:

disposing at least a first transmissive spectral filter and a second transmissive spectral filter about an axis of rotation, each spectral filter having a filter width that is defined by its first and second edges, wherein the filter width is measured in a direction that is orthogonal to the single axis of rotation and wherein the plane of each of the at least first and second transmissive spectral filters is substantially parallel to the single axis of rotation;

revolving at least the first edge of each of the at least first and second transmissive spectral filters about the axis of rotation, with the first edges of the at least the first and second transmissive spectral filters substantially equidistant from the single axis of rotation at any angle of filter revolution; and defining, between the first and second edges of at least the first spectral filter over a first 60 degree range of angular revolution about the axis of rotation, the filtered light path as an undeviated linear light path of at least about half the filter width, wherein the filtered light path extends orthogonally with respect to the single axis of rotation.

* * * * *